United States Patent [19]

Huang et al.

[11] Patent Number: 5,258,123
[45] Date of Patent: Nov. 2, 1993

[54] PROCESS FOR DEWATERING AN AQUEOUS SOLUTION CONTAINING SOLIDS USING WATER-ABSORBENT SUBSTANCES

[75] Inventors: Pin Y. Huang; Yuh-Hwang Tsao; Martin E. Ubelhor, all of Houston, Tex.

[73] Assignee: Exxon Production Research Company, Houston, Tex.

[21] Appl. No.: 907,956

[22] Filed: Jul. 2, 1992

[51] Int. Cl.$^5$ .............................................. B01D 15/00
[52] U.S. Cl. ................................... 210/663; 210/670; 210/689; 210/675
[58] Field of Search ............... 210/708, 689, 670, 663, 210/665, 675

[56] References Cited

U.S. PATENT DOCUMENTS

| | | | |
|---|---|---|---|
| 3,276,966 | 10/1966 | Talbot | 175/66 |
| 3,433,312 | 3/1969 | Burdyn et al. | 175/66 |
| 3,637,031 | 1/1972 | Hull et al. | 175/66 |
| 3,658,745 | 4/1972 | Merrill et al. | 260/29.6 |
| 3,935,099 | 1/1976 | Weaver et al. | 210/43 |
| 4,045,387 | 8/1977 | Fanta et al. | 260/17.4 |
| 4,127,482 | 11/1978 | Watson et al. | 210/53 |
| 4,134,863 | 1/1979 | Fanta et al. | 260/17.4 |
| 4,194,998 | 3/1980 | Fanta et al. | 260/17.4 |
| 4,303,505 | 12/1981 | Capes et al. | 210/689 |
| 4,358,380 | 11/1982 | Hasegawa et al. | 210/679 |
| 4,417,976 | 11/1983 | Sander et al. | 210/708 |
| 4,430,230 | 2/1984 | Satake | 210/708 |
| 4,451,377 | 5/1984 | Luxemburg | 210/708 |
| 4,555,344 | 11/1985 | Cussler | 210/689 |
| 4,599,117 | 11/1986 | Luxemburg | 134/25.1 |
| 4,648,962 | 3/1987 | Capes et al. | 210/708 |
| 4,828,701 | 5/1989 | Cussler | 210/634 |
| 4,828,710 | 5/1989 | Itoh et al. | 210/689 |
| 4,913,585 | 4/1990 | Thompson et al. | 210/728 |

OTHER PUBLICATIONS

Hirokawa, Y. and Tanaka, T., "Volume Phase Transition in a Nonionic Gel," J. Chem Phys, vol. 81, 1984, pp. 6379-6380.
Wojtanowicz, A. K., "Modern Solids Control: A Centrifuge Dewatering-Process Study," SPE/IADC paper 16098 presented at the 1987 SPE/IADC Drilling Conference held in New Orleans, Louisiana (Mar. 1987).
Huang, X., Takashi, A., Unno, H., and Hirasa, O., "Dewatering of Biological Slurry by Using Water-Absorbent Polymer Gel," Biotechnology and Bioengineering, vol. 34, pp. 102-109 (1989).
Malachosky, E., Sanders, R., and McAuley, L., "The Impact of the Use of Dewatering Technology on the Cost of Drilling Waste Disposal," SPE/IADC paper 19528 presented at the 64th Annual Technical Conference and Exhibition of SPE held in San Antonio, Texas (Oct. 1989).
Wojtanowicz, A. K. and Griffin, J. M., "Drilling Fluid Dewatering: Economic Evaluation with Case History," SPE paper 20292, Unpublished (Copyright 1989).
Masuda, K. and Iwata, H., "Dewatering of Particulate Materials Utilizing Highly Water-Absorptive Polymer," Powder Technology, vol. 63 No. 2, pp. 113-119 (Nov. 1990).
Hirasa, O., Ito, S., Yamauchi, A., Fujishige, S., and Ichijo, H., "Thermoresponsive Polymer Hydrogel," Polymer Gels, Plenum Press, New York, 1991.

(List continued on next page.)

*Primary Examiner*—Stanley S. Silverman
*Assistant Examiner*—Cynthia L. Nessler
*Attorney, Agent, or Firm*—Gary D. Lawson

[57] ABSTRACT

A process for dewatering an aqueous fluid containing solids using water-absorbent substances is disclosed. A water-absorbent substance and a body to which the solids will adhere are added to the solids-containing aqueous fluid. The water-absorbent substance absorbs water and the solids coat the solids-adhering body. The water-laden substance may then be separated from the solid-adhering body that is coated with solids, thereby separating the water and the solids.

26 Claims, 1 Drawing Sheet

OTHER PUBLICATIONS

Kajiwara, K. and Ross–Murphy, S. B., "Synthetic Gels on the Move," Nature, vol. 355, pp. 208–209 (Jan. 1992).

Tanaka, T., "Gels," Scientific American, vol. 244, pp. 124–138, 1981.

Aqua Magic Advertisement (undated).

Sakohara, S., Taniguchi, N., and Asaeda, M. (1990). "Mechanism of Polyacrylate Gel Shrinkage in an Electric Field," Journal of Chemical Engineering of Japan, vol. 23, pp. 675–680.

Gehrke, S. H. and Lyu, L. H. (1990). "Dewatering Fine Coal Slurries by Gel Extraction," A Final Project Report submitted to Ohio Coal Development Office, Department of Development, State of Ohio.

Harsh, D. C. and Gehrke, S. H. (1991). "Controlling the Swelling Characteristics of Temperature Sensitive Cellulose Ether Hydrogels," Journal of Controlled Release, vol. 17, pp. 175–186.

PROCESS FOR DEWATERING AN AQUEOUS SOLUTION CONTAINING SOLIDS USING WATER-ABSORBENT SUBSTANCES

FIELD OF THE INVENTION

This invention relates to a process for the separation of solids from an aqueous solution containing solids. More specifically, the invention relates to a process for dewatering an aqueous solution containing solids using a water-absorptive substance and a body to which the solids have an affinity.

BACKGROUND OF THE INVENTION

In the drilling of oil and gas wells by the rotary method, aqueous drilling liquids are commonly used during drilling operations. These drilling liquids are commonly called "mud". The mud is circulated down through the drill string and out the drill bit at the lower end of the drill string and then circulated up through the wellbore to the earth's surface where it is commonly recirculated back down into the wellbore. The mud contains cuttings produced in the drilling process (especially clay) and various substances that are added to give it the desired chemical and physical properties. At the surface the mud passes through solids control equipment to remove unwanted solids. The larger solids are removed by shale shakers and hydrocyclones. However, ultra-fine particles (less than about 20 microns) will continue to circulate through the system unless special solids removal equipment is used. These ultra-fine particles in water-based muds form colloidal suspensions in the water. The difficulty of removing these small particles increases as the particle size decreases.

Due to increasing environmental concerns and escalating disposal costs, there is growing incentive to reduce the volume of drilling wastes. One way of reducing the drilling waste volume is to reduce the amount of water discharged with solids disposal. Drilling rigs in some cases produce up to about two barrels of liquid waste for every foot of hole drilled. Thus, drilling operations can generate large quantities of waste.

The effectiveness of a solids control system for drilling operations can be measured by the amount of solids removed from the treated mud and the amount of water in the solids that are removed. Ideally, the solids control system will remove all drilled solids from the treated mud and the removed solids will be dry.

Several processes have been suggested to remove solids from drilling muds. For removing particle sizes ranging down to about 20 microns in diameter, conventional decanting centrifuges are used. To remove solids below about 20 microns, coagulants and flocculating agents have been added to muds. These so-called chemically enhanced centrifugation processes aggregate the fine, drilled particles allowing them to be more easily separated from the fluid by centrifugation. Coagulants that have been used include aluminum, iron and calcium salts, and cationic polymers. Flocculants that have been used include water-soluble polyacrylamides, water-soluble poly(acrylic acid) and its homologues, water-soluble poly(ethylene oxide) resins, polyvinyl alcohol, water-soluble carboxymethylcellulose, and guar gum. The water recovered by centrifugation is returned as needed to the mud system and the separated solids are discharged as waste.

Although chemically enhanced centrifugation processes are effective in removing solids from a drilling fluids system, there is a substantially unfilled need for an improved process for dewatering aqueous drilling fluids without adding coagulants and flocculants. Introducing chemically active substances to a drilling fluids system can affect the drilling fluids physical and chemical properties. In addition, chemically enhanced centrifugation can also remove large amounts of liquid with the solids.

SUMMARY OF THE INVENTION

The present invention relates to an improved process for separating solids and water from an aqueous fluid containing the solids. The aqueous fluid is contacted with a water-absorbing substance and a solids-adhering body. The water-absorbing substance absorbs water from the aqueous fluid and the solids coat the solids-adhering body. The water-laden substance and the solids-coated body are separated to effectively separate the solids and water contained in the solids-containing aqueous fluid.

In one embodiment of this invention, a portion of a water-based drilling fluid being circulated in a well drilled into subterranean formations is dewatered using water-absorbent polymeric gel and metallic balls. The drilling fluid contains drilled solids, principally clay. The drilling fluid is mixed with the polymer and balls. The polymer becomes swollen with water, which may include electrolytes and other mud additives, and the drilled solids coat the balls. The water-swollen polymer is then separated from the solids-coated balls. The swollen polymer may optionally be regenerated by shrinking the polymer, thereby releasing absorbed water. The semi-clean water may be reused in the drilling fluid. The solids on the balls may be removed and the balls used again in the practice of this invention.

In another embodiment, the process of this invention may be used to dewater coal slurries containing clay. The steps for dewatering a coal slurry are substantially the same as those for dewatering drilling fluids. A water-absorbent polymeric gel and a clay-adhering body, preferably metallic balls, are introduced to a clay-containing coal slurry and mixed. The polymeric gel and balls may be the same as those suggested for use in the embodiment described above for dewatering drilling mud. During mixing of the coal slurry, coal and clay particles adhere to the surfaces of the metallic balls and the water is absorbed in the gel. The coal-laden balls may then be separated from the water-swollen gel using the same separation procedures for separation of clay-laden balls from swollen gel as described above for dewatering drilling mud.

BRIEF DESCRIPTION OF THE DRAWING

The Drawing is a block flow diagram illustrating one embodiment of practicing the process of this invention and it is not intended to exclude from the scope of the invention other embodiments set out herein or which are the result of normal and expected modifications of this specific embodiment.

DESCRIPTION OF THE PREFERRED EMBODIMENTS

Figure 1:
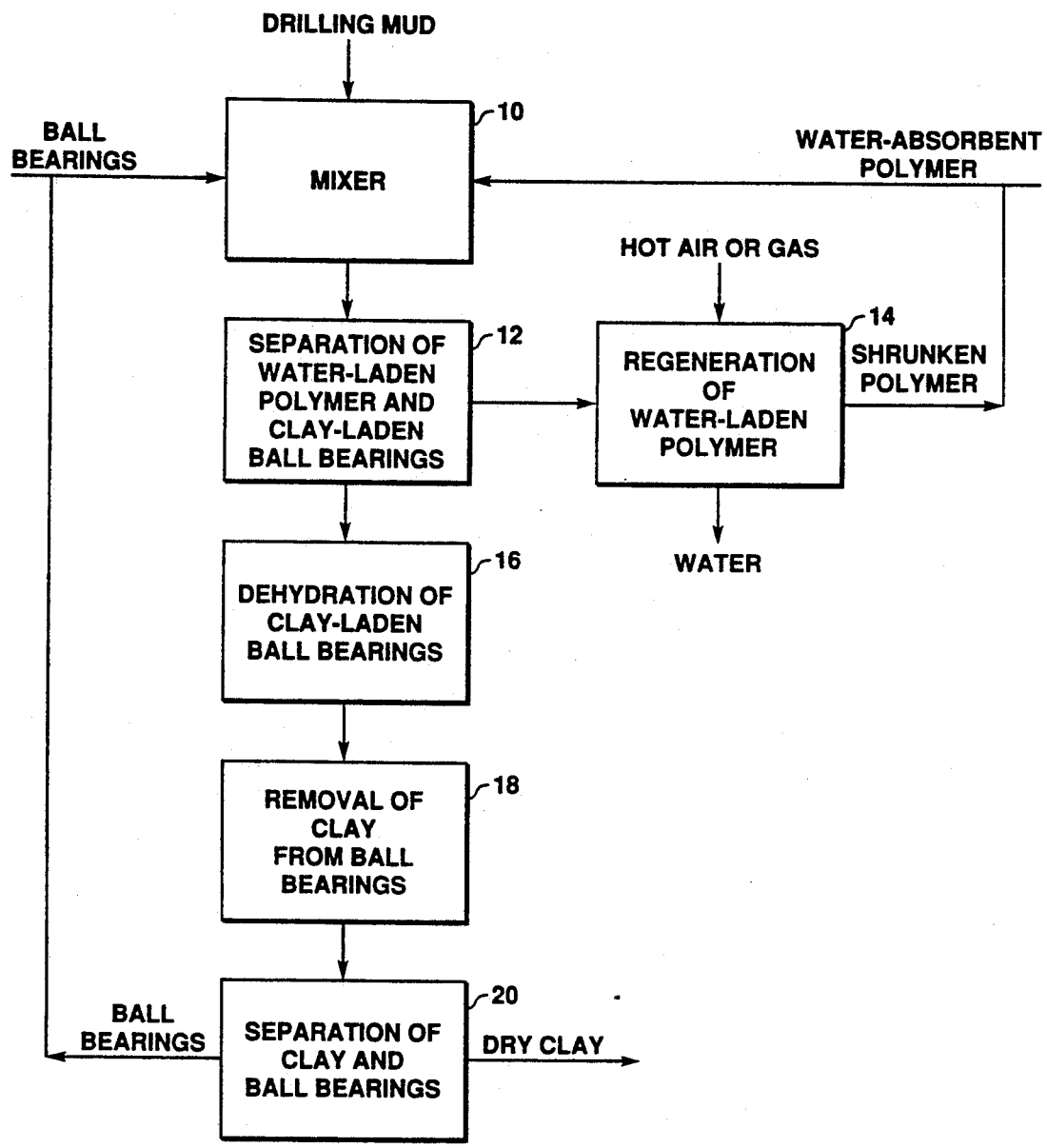

This invention is generally applicable to any process of separating solids and water in solutions containing solids and water. In the practice of this invention, a solids-adhering body and a water-absorbing substance such as a polymeric gel are brought into contact with an aqueous fluid containing solids. The water-absorbing substance absorbs water and the solids coat the solids-adhering body. The water-laden substance and the solids-adhering body may be separated from each other by any suitable means, thereby effecting separation of the water and solids. The water-laden substance may be dewatered and used again. Likewise, the solids on the solids-adhering body may be removed from the body so the body can also be reused.

This invention effectively separates water and solids without addition of agglomerating chemicals which could affect the physical and chemical properties of the aqueous fluid and without the need for water dilution as is typically required in chemically enhanced separation or multiple centrifuge processes. It will be apparent from this disclosure that this invention has broad applicability.

The practice of one embodiment of this invention is illustrated by a method to remove water from an aqueous drilling fluid, or "mud", which typically contains suspended solids such as bentonite clays and suspended earth formation solids. Rather than remove drilled solids from aqueous mud as is the conventional practice, this invention uses water-absorbent polymeric gel to remove water from the mud, thereby reducing the amount of water in the solids discharge. The dewatered drilled solids, in the presence of the water-swollen gel, is a sticky paste. The inventors have discovered a process for separating the sticky paste and the water-swollen gel to effectively remove water from the drilled solids. The Drawing illustrates in block diagram form the practice of this embodiment.

Referring to Drawing, into mixer 10 are introduced a portion of an aqueous drilling fluid (mud) being used to drill a well into subterranean formations. The mud contains suspended drilled solids. Also introduced into the mixer 10 are metallic spheres and a water-absorbing polymer. The metallic spheres and polymer may be introduced into the mixer simultaneously or separately, in any order. The mud, spheres, and polymer are mixed until the rate of swelling by the polymer stabilizes and drilled solids coat the metallic spheres.

The polymer used in the practice of this invention can be any water-absorbent polymer that rapidly absorbs several tens to several hundreds of times its own weight of water. Preferably, the polymer will exhibit the following properties: substantially insensitive to ions, capable of rapid swelling and shrinking, capable of reversible change of swelling and shrinking, small energy amounts needed for regeneration, and substantially insoluble in the fluid being treated. While this disclosure refers to polymer in the singular sense, this invention is not limited to using only one polymer composition in the dewatering process. Two or more water-absorbent polymers may be used at the same time or in multiple stages.

Non-limiting examples of suitable polymers in the practice of this invention include high-purity acrylic acid which is sold by Mitsubishi Petrochemical Company Ltd. under the trademark DIAWET AL-3; a composite of polyvinyl alcohol and polyacrylic acid which is sold by Sumitomo Chemical Company Ltd. under the trademark Sumikagel S-50L; starch grafted sodium acrylate which is sold by Hoechst Celanese Company of America under the trademarks SANWET IM-3500L and SANWET IM-1500LP; cross-linked sodium acrylate which is sold by Nippon Shokubai of America under the trademarks Acryhope GH-2 and AQUALIC; and sodium poly(acrylic acid) which is sold by Arakawa Chemical Industries Ltd. in Japan under the trademark ARASORB SRC.

The polymers listed above are ionic. However, this invention is not limited to ionic polymers, and may include non-ionic, thermal-responsive polymeric gels. Examples of suitable non-ionic polymers include vinyl ether derivatives such as poly(vinyl methyl ether) gel, N-substituted polyacrylamide derivatives such as N-isopropylacrylamide gel, and cellulose ethers such as hydroxylpropyl cellulose ether gel.

The amount of polymer needed in the practice of this embodiment will depend on the amount of water to be removed from the mud. The amount of polymer is not a critical feature of this invention. Preferably, however, sufficient polymer will be used to absorb water within a reasonable time in the mixer 10. The amount of polymer used will depend on the initial solids content of the mud and the polymer's water-absorbing capability. Those skilled in the art can determine the amount of polymer needed based on its known water-absorptive properties.

No limit is placed on the shape of the gel used in the practice of this invention. However, experimental tests have shown that polymers that are in particulate form, preferably spherical in shape, are more effective in the practice of this invention than polymers having other shapes. It has been observed that the shape and size of the polymer can affect the efficiency of separating water-swollen polymer from dewatered solids. If polymers of irregular shapes are used, solids are more likely to become entrapped in crevices or cavities that are exposed when the irregular shaped polymer gels are swollen during water absorption.

The solids content of unweighted, water-based muds in typical drilling operations will be less than about 20 weight percent of the mud. The practice of this invention is not limited to such solids concentrations. However, laboratory tests conducted by the inventors have shown that the water absorbing efficiency of the water-absorbent polymers significantly decreases as the solids content of the mud exceeds about 60 to 70 weight percent.

The metallic spheres used in this embodiment can be any metallic material to which clay particles have an affinity. Steel ball bearings are preferred. The number of spheres used will depend on the volume of drill solids to be removed and the desired thickness of the solids layer covering each sphere. Sufficient spheres should be used to provide enough surface area for a solids layer around each sphere so that the thickness of the layer is between about 10 microns to about 1 millimeter. For typical mud systems, sufficient spheres may be added to mixer 10 to have a solids coating on the spheres ranging from about 200 to about 400 microns. Determining the number of spheres to be used can be determined using routine engineering calculations taking into account the diameter of the balls and the volume of solids to be removed.

The diameter of the individual spheres is not a critical feature of this invention. However, the spheres' diameter can effect the efficiency of the process. The diameter of the spheres is preferably larger than about 3 mm. and less than about 9 mm.

Although this embodiment uses metallic spheres for surfaces on which the drilled solids adhere, this invention is not limited to use of metallic spheres. Any solids-adhering body to which the drill solids have an affinity may be used in this invention. For example, the solids-adhering body may be a metallic flat surface that is in contact with the drilling fluid and water-absorbent polymer or the body may be the inside metallic surface of a rotary drum. The solids-adhering body may also comprise metal rods, wire screen, or the like that are suspended in a mixture of the drilling fluid and polymer.

The practice of this invention is also not limited to only one solids-adhering body. If multiple bodies are used, such as metallic balls, it is not necessary that the bodies have the same composition. For example, balls made of different materials may be used to selectively attract certain components of a solids mixture.

The mixing of mud, metallic spheres, and polymer is preferably carried out at ambient temperature and pressure. The mixing can be performed using conventional mixing equipment. The mixing should not, however, be so vigorous as to cause shearing of the clay that coats the spheres.

Returning to the Drawing, the mixed materials from mixer 10 are sent to a separator 12 for separation of the water-laden polymer and the clay-laden spheres. This separation may be performed using any suitable separation equipment that separates polymeric gel from the spheres. For example, the polymer may be winnowed from the spheres by blowing air or other gases. An example of another separation process may include a vibrating screen which selectively permits the polymer to pass through the screen leaving the clay-coated spheres. If a screen is used for separation, the screen surface preferably is made of a material that does not have an affinity for clay. If the screen's surface is metallic, for example, the clay may stick to the screen which could cause screen clogging. The screen is preferably nonmetallic, and more preferably is plastic.

For an economic process, the swollen polymeric gel should be regenerated. Referring to the Drawing again, the separated gel is sent to regenerator 14 for dewatering and shrinking. The regenerator may be any process that causes gel to shrink and thereby yield a dewatered gel for recycling or disposal. The optimal regeneration technique depends on the gel selected. Many gels can be shrunk by small changes in the external conditions. For example, many gels can be regenerated by changing one or more of the following: temperature, pH, composition of the continuous phase (water), and ionic strength. Some gels are also responsive to having an electric field across it. The particular mechanism for regenerating the gel will depend on the gel used. By way of example, DIAWET AL-3, one of the polymer gels proposed for this embodiment, may be dewatered by passing an electric current through it or by contacting the swollen gel with acid solutions having pH values of 1 to 3. For themo-responsive polymers, such as hydroxylpropyl cellulose ether gels, the swollen gel reverts to its shrunken form and expels the water it absorbed from the slurry upon slight warming. Those skilled in the art can determine the most effective means for gel-regeneration.

The water released in the dewatering process in regenerator 14 may be recycled to the drilling fluid system or discharged as semi-clean waste water. The shrunken gel may be recycled back to mixer 10 for reuse.

The clay-laden spheres from separator 12 are sent to a dehydrator 16 for removing water from the sticky clay that coats the spheres. The dehydration can be carried out using any conventional dryer system. Suitable drying systems may include drum drying and freeze drying. A preferred drying process uses exhaust heat from the engine that is used in drilling operations, such as a diesel or the like.

The dehydrated solids from dehydrator 16 may be sent to an impactor 18 to remove the clay from the spheres. The layer of dried clay solids is brittle and can be removed or shattered from the ball bearings by impact with a hard surface. Any suitable impactor means may be used. The spheres may be crushed, agitated, vibrated, or ground to forcibly remove the dried clay from the spheres.

From impactor 18 the clay and spheres may be sent to a separator 20 for separation of the dried clay and spheres. A screen or other suitable separator may be used. The cleaned spheres may then be returned to the mixer 10 for reuse. The dry clay from separator 20 may be bagged and reused commercially or it may be disposed of in an environmentally acceptable manner.

In another embodiment of this invention, the process may be used to dewater coal slurries containing clay. In this embodiment a water-absorbent polymeric gel and a clay-adhering body, preferably metallic balls, are introduced to a clay-containing coal slurry and mixed. The polymeric gel and clay-adhering body may be the same as those suggested for use in the embodiment described above for dewatering drilling mud. During the mixing, the dewatered coal and clay adhere to the surfaces of the metallic balls and water is absorbed by the polymer. The coal-laden metallic balls may then be separated from the water-swollen gel using the same separation process described above for separating clay-laden spheres from swollen gel in dewatering drilling mud.

While not wishing to be bound by any particular theory, it is believed that a bridging agent, such as clay, is a necessary component of the coal slurry for dewatering the slurry in the practice of this invention. When the clay in the slurry is dewatered by the polymeric gel, the clay becomes a sticky paste which adheres to the metallic balls. The coal particles then stick or become entrapped in the clay paste. It is believed that if the coal is completely free of a substance that has an affinity for metallic balls in the presence water-absorbent gel, the coal would not adhere to the balls tightly enough to economically practice this invention. Only small amounts of clay are needed to dewatered the coal slurry. Clay concentrations typically found in mined coal may be sufficient to practice this embodiment. If the coal is substantially free of clay, clay may be added to the coal slurry either before or at the same time as water-absorbent polymer and metallic balls are added.

The process of this invention is not limited to dewatering aqueous drilling fluids or coal slurries as disclosed in the above embodiments. This invention may also be used, for example, to dewater biological slurries, such as excess activated sludge from waste water treatment plants, and organic waste slurries from alcohol production processes. If such aqueous slurries do not contain particles which when dewatered are in a sticky-paste form and have an affinity for the solids-adhering body, such particles may be added to the slurry in the practice of this invention. These added particles serve as bridging agents for slurry solids that do not effectively coat the solids-adhering body without the presence of the bridging agents. Clay is a suitable bridging agent when steel balls are the solids-adhering body. The clay may be added either before or simultaneously with introduction of metallic balls and water-absorbent polymer. Solids that adhere to the metallic balls and the water absorbed by the polymer may then be separated in accordance with the practice of this invention.

The invention may be better understood by reference to the following examples which are offered only as illustrative embodiments of the invention and are not intended to be limited or restrictive thereof.

LABORATORY EXPERIMENTS-DRILLING FLUIDS

A series of six laboratory tests were performed used three compositions of aqueous slurries which simulated water-based drilling fluids containing suspended solids. The three slurries used in the tests are referred to herein as Gel-LIG, PHPA, and Rig Mud. The compositions of the three slurries were as follows.

Each barrel of Gel-LIG contained, in addition to water, 35 pounds (15.87 kg.) of Rev Dust, a product available from Milpark Drilling Fluids Company, which simulates suspended solids in oil field drilling operations; 18 pounds (8.16 kg.) of bentonite clay; and 2.5 pounds (1.13 kg.) of lignosulfonate, a thinner commonly used in drilling operations.

Each barrel of PHPA contained water, 45 pounds (20.41 kg.) of Rev Dust; 10 pounds (4.54 kg.) of bentonite clay; and one pound (0.454 kg.) of New-Drill HP, a trademarked polymer available from Milpark Drilling Fluids, which suspends solids in the aqueous solution.

The Rig Mud was an actual water-based drilling fluid obtained from a drilling operation in Oklahoma.

In each test a 100 ml. sample of aqueous slurry was mixed with DIAWET AL-3, a trademarked product available from Mitsubishi Petrochemical Co. Ltd., in an amount ranging from 5 to 15 weight percent of the slurry. The polymer was generally spherical in shape with the particles having an average diameter from 0.2 to 0.3 mm. At the same time the polymer was added to the slurry, 100 ml of steel ball bearings, each ¼ inch (6.41 mm.) in diameter, was added to the slurry. Each slurry/polymer/ball bearing mixture was then shaken vigorously by hand from 90 to 120 seconds in a 750 ml plastic bottle. All the tests were carried out at room temperature and atmospheric pressure. After the agitation, the ball bearings were coated with a sticky, dewatered paste. The water-swollen polymer was then separated from the clay-coated ball bearings using a plastic #10 mesh screen. The separation was accomplished by hand-shaking the screen. The clay on the bearings were then oven-dried and the moisture content of the clay analyzed. After being oven-dried the clay layer on the ball bearings was brittle. To determine the residual clay content in the polymer, the swollen polymer was burned off in a high temperature oven overnight. Summaries of the experiments are shown in the Table below.

TABLE

| Mud type | Volume of Polymer/ Slurry (ml) | Solids Content in the Slurry (wt %) | Solids Content of Paste on the ball bearings (wt %) | Percent Solids removed from the Slurry (wt %) |
|---|---|---|---|---|
| Gel-LIG | 10.30/100.9 | 12.3 | 59.9 | >95 |
| Gel-LIG | 15.26/100.3 | 12.3 | 59.5 | 91.3 |
| PHPA | 10.24/100.5 | 14.6 | 61.8 | >95 |
| PHPA | 15.14/100.6 | 14.6 | 59.1 | 95 |
| Rig Mud | 10.58/100.2 | 13.5 | 63.2 | >95 |
| Rig Mud | 15.02/100.2 | 13.5 | 63.4 | 83.5 |

As seen in this Table, the solids content of the clay coating on the ball bearings ranged from 59.1 to 63.4 weight percent. From 83.5 to over 95 weight percent of the solids in each slurry was removed. Less than 16.5 weight percent of the solids was retained by the swollen polymer.

LABORATORY EXPERIMENT-COAL SLURRY

A laboratory test was performed to dewater an aqueous coal slurry containing clay in accordance with the practice of this invention. The coal particles were less than one mm in diameter and the coal contained about 3 to 4 weight percent clay. A water-absorptive polymer gel and 100 ml. of steel ball-bearings were mixed with a 100 ml sample of an aqueous coal slurry in a 750 ml. plastic bottle. The ball bearings had a ¼ inch (6.41 mm.) diameter. The water-absorptive polymer was made of polyvinyl alcohol and polyacrylic acid. The polymer particles were generally spherical in shape, ranging from 3 mm. to 4 mm. in diameter. The amount of polymer used in the test was about 10 weight percent of the slurry. The polymer was made by Sumitomo Chemical Co. Ltd., which is marketed under the trademark Sumikagel S-50L. The test was carried out at room temperature and atmospheric pressure. The mixture was agitated for about 6 minutes.

In the presence of small amounts of clay solids, the dewatered coal slurry has an affinity for the steel ball bearings' surfaces and a layer of dewatered paste was coated on the ball bearings. The swollen polymer was then separated from the steel balls coated with dewatered clay and coal paste using plastic 10-mesh sieve trays. The coal-clay paste was 72 weight percent moisture before drying.

Coal-laden ball bearings were dried with low-grade heat sources. The coating of coal solids was separated from the ball bearings by the impact between the steel balls and the container wall of a plastic bottle. In this test the ball bearings were used both as bodies on which coal particles adhered and as impact crushers for recovering dried drill solids. The more finely-crushed dry coal particles and clean ball bearings were separated using regular 10-mesh sieve trays. The ball bearings were collected for reuse.

HYPOTHETICAL FIELD EXAMPLE-DRILLING OPERATION

This hypothetical example is provided to illustrative how one embodiment of this invention may be practiced in a drilling operation. During drilling of a subterranean well using water-based drilling fluids containing lignosulfonate and bentonite, samples of the mud are mixed with DIAWET AL-3. The water-absorptive polymer used in this example is in granular form. Each granule is generally spherical in shape with the granules ranging in diameter from 200 microns to 300 microns. If the polymeric particles have a diameter greater than about 1 mm., the polymer gel may require longer dewatering time due to diffusion limitations of water into the polymer during water absorption. The amount of polymer used will generally range from about 5 to about 10 weight percent of the drilling fluid. Steel ball bearings having a diameter of about ¼ inch (6.41 mm.) are also added to the drilling fluid. The volume of ball bearing will be about equal to the volume of the drilling fluid to be treated. The drilling fluid, polymer, and ball bearings are directed to a cylindrical, rotating drum fitted with an auger scraper. Both the inner surface of the drum and the auger scraper are lined with a plastic material. The cylindrical drum mixes the drilling fluid/polymer/ball bearing mixture at ambient temperature and pressure for about 120 to 150 seconds. The sticky paste, which comprises the clay particles in the drilling fluid, has a high affinity for steel ball bearings. A layer of dewatered paste is coated on the ball bearings. The swollen polymer can then be easily separated from the clay-laden steel balls using plastic sieve trays having number 10 mesh openings.

The clay-laden ball bearings may be dried using exhaust heat from drilling rig diesel engines using a conveyor dryer or rotary dryer. The coating of dried solids can be separated from the ball bearings by the impact between the steel balls and the container wall. The steel balls function as impact crushers for removing the dried drill solids from the balls.

The dry solids and clean ball bearings are separated using regular sieve trays (#10 mesh). Ball bearings are collected and recycled back to the rotating drum. The dry clay solids are collected in a holding tank for disposal or beneficial reuse.

If non-ionic, thermal-responsive polymers are used in the practice of this invention, the swollen polymer gel can be regenerated and recycled using low-grade steam or exhaust heat from rig diesel engines. The swollen polymer gel releases water and shrinks back to its original state reversibly in response to temperature. For ionic polymer gels, swollen polymers may be regenerated and recycled by applying electric fields or currents across the gels. Since water-absorptive polymers are excellent soil conditioners, swollen polymer may also be made available for horticultural or agricultural use.

The principle of the invention and the best mode in which it is contemplated to apply that principle have been described. It is to be understood that the forgoing is illustrative only and that other means and techniques can be used without departing from the true scope of the invention defined in the following claims.

What we claim is:

1. A process for separating solids and water from an aqueous fluid containing said solids comprising:
    mixing the aqueous fluid with a water-absorbing substance;
    allowing the water-absorbing substance to absorb water, creating a water-laden substance;
    contacting the aqueous fluid with a solids-adhering body;
    allowing the solids to adhere to the solids-adhering body; and
    separating the water-laden substance and solids-adhering body having solids adhered thereto, thereby separating the solids and water.

2. The process of claim 1 wherein said water-absorbing substance is a polymeric gel.

3. The process of claim 1 wherein the aqueous fluid is a drilling fluid.

4. The process of claim 1 wherein the aqueous fluid is a coal slurry containing clay.

5. The process of claim 1 wherein said solids are cuttings from a subterranean borehole.

6. The process of claim 1 wherein said solids-adhering body is metallic.

7. The process of claim 1 wherein said solids-adhering body comprises a plurality of metallic balls.

8. The process of claim 1 wherein the step of separating the water-laden substance and the solids-adhering body uses a screen.

9. The process of claim 1 further comprising removing the solids that have adhered to the solids-adhering body.

10. The process of claim 1 further comprising dehydrating the solids adhered to the solids-adhering body and then removing the solids from the solids-adhering body.

11. The process of claim 10 wherein the process of dehydrating said solids adhered to the solids-adhering body is performed by applying heat to said solids.

12. The process of claim 11 wherein the heat applied to said solids is from the exhaust of an engine.

13. The process of claim 1 further comprising removing water from the water-laden substance and then reusing the dewatered substance by repeating the first step of adding the substance to the aqueous fluid.

14. The process of claim 1 wherein the water-absorbing substance is a cellulose ether gel.

15. The process of claim 1 wherein the water-absorbing substance is high-purity acrylic acid polymeric gel.

16. A process for treating a water-based, clay-containing drilling fluid being circulated in a well drilled into subterranean formations, which comprises the steps of:
    (a) directing a portion of said drilling fluid into a mixer;
    (b) directing into the mixer metallic balls;
    (c) directing into the mixer a water-absorbent gel;
    (d) mixing said water-absorbent gel, said metallic balls, and said drilling fluid portion, thereby allowing the water-absorbent gel to become swollen with water and the clay to coat the metallic balls;
    (e) directing the water-absorbent gel, metallic balls, and drilling fluid portion to a separator; and
    (f) separating the water-swollen gel and the clay-coated balls.

17. The process of claim 16 further comprising the steps of regenerating the water-swollen gel by shrinking the gel to remove water therefrom.

18. The process of claim 16 wherein regenerating the water-swollen gel is performed by warming the water-swollen gel so that it shrinks to a reduced volume and releases at least a portion of the absorbed water.

19. The process of claim 18 further comprises directing the shrunken gel to step (c) of claim 16.

20. The process of claim 16 further comprises removing clay coated to the metallic balls.

21. The process of claim 16 wherein the steps (b) and (c) are performed simultaneously.

22. A process for dewatering a clay-containing, aqueous coal slurry comprising the steps of
    adding to said slurry a water-absorbent polymeric gel;
    adding to said slurry a body to which said clay has an affinity in the presence of said polymeric gel;
    allowing said polymeric gel to absorb water from the aqueous coal slurry and the clay and coal to coat said body; and
    separating the water-laden polymeric gel and said body.

23. A process for dewatering an aqueous solution containing a first particulate solids, which comprises
    introducing to the aqueous solution a second particulate solids, said second particulate solids forming a sticky paste in said aqueous solution when said solution is dewatered;
    mixing said second particulate solids with the said first particulate solids;

introducing to the aqueous solution a water-absorbing polymeric gel for absorption of water, thereby causing the second particulate solids to be a sticky paste;

introducing to the aqueous solution a body having an affinity for said second particulate solids in sticky paste form;

allowing said water-absorbing polymeric gel to become laden with water and said first particulate solids and said second particulate solids to coat said body; and separating the water-laden gel and the body having said first and second particulate solids coated thereon, thereby dewatering the aqueous solution.

24. The process of claim 23 wherein the second particulate solids is clay.

25. The process of claim 23 wherein the first particulate solids is coal and the second particulate solids is clay.

26. A process for dewatering an aqueous solution containing a particulate substance comprising the steps of contacting said solution with a water-absorbent polymeric gel, said gel substantially dewatering said solution leaving said particulate substance as a sticky paste;

contacting said gel and said particulate substance with a body to which said sticky particulate substance will adhere, thereby coating said body with said particulate substance;

directing said gel containing water and said body coated with said particulate substance to a separator; and separating said gel containing water and said body coated with said particulate substance.

* * * * *